United States Patent
Huang et al.

(10) Patent No.: US 12,252,413 B1
(45) Date of Patent: Mar. 18, 2025

(54) PREPARATION METHOD FOR ULTRA-HIGH COMPACTED LITHIUM IRON PHOSPHATE CATHODE MATERIAL AND LITHIUM BATTERY

(71) Applicant: Hunan Yuneng new energy battery materials Co., LTD., Xiangtan (CN)

(72) Inventors: Xinlong Huang, Xiangtan (CN); Tao Chen, Xiangtan (CN); Kun Cheng, Xiangtan (CN); Yang Yu, Xiangtan (CN)

(73) Assignee: Hunan Yuneng new energy battery materials Co., LTD., Hunan (CN)

( * ) Notice: Subject to any disclaimer, the term of this patent is extended or adjusted under 35 U.S.C. 154(b) by 0 days.

(21) Appl. No.: 18/967,417

(22) Filed: Dec. 3, 2024

(30) Foreign Application Priority Data

Jun. 24, 2024 (CN) .......................... 202410819387.7

(51) Int. Cl.
*C01G 49/00* (2006.01)
*H01M 10/052* (2010.01)

(52) U.S. Cl.
CPC ........ *C01G 49/009* (2013.01); *H01M 10/052* (2013.01); *C01P 2004/03* (2013.01); *C01P 2006/40* (2013.01)

(58) Field of Classification Search
CPC .. C01G 49/00; H01M 10/052; H01M 10/0525
See application file for complete search history.

(56) References Cited

U.S. PATENT DOCUMENTS

2014/0239235 A1   8/2014  Kong et al.

FOREIGN PATENT DOCUMENTS

| CN | 114068920 A | 2/2022 | |
|---|---|---|---|
| CN | 114665056 A | 6/2022 | |
| CN | 118833791 A | * 10/2024 | ............. C01B 25/45 |

* cited by examiner

*Primary Examiner* — Karie O'Neill Apicella
(74) *Attorney, Agent, or Firm* — Valet Patent Service Limited

(57) ABSTRACT

The present application belongs to the field of lithium battery technology, particularly relating to a preparation method for ultra-high compacted lithium iron phosphate cathode material and lithium battery. The method comprises: obtaining an iron-containing precursor based on iron phosphate and dispersant; Mixing the iron-containing precursor, lithium source, phosphorus source, and first carbon source for first sintering to obtain the first precursor mixture and grinding to the first preset particle size to obtain the first precursor; Mixing the iron-containing precursor, lithium source, phosphorus source, and second carbon source for second sintering to obtain the second precursor mixture and grinding to the second preset particle size to obtain the second precursor; Mixing the first precursor, second precursor, and third carbon source and performing a third sintering to obtain the lithium iron phosphate cathode material, improving the coating integrity of the first carbon coating.

4 Claims, 2 Drawing Sheets

PREPARATION METHOD FOR ULTRA-HIGH COMPACTED LITHIUM IRON PHOSPHATE CATHODE MATERIAL AND LITHIUM BATTERY

TECHNICAL FIELD

The present application belongs to the technical field of lithium batteries, and particularly relates to a preparation method for ultra-high compacted lithium iron phosphate cathode material and lithium battery.

BACKGROUND

The lithium iron phosphate electrode material has an olivine structure. Since Lit can only be transported along a one-dimensional channel, the diffusion coefficient of lithium ions is relatively low, resulting in poor conductivity and low-rate performance (i.e., low specific capacity).

Currently, commonly used modification preparation methods for lithium iron phosphate comprise crystal nano-crystallization and surface coating. However, only modifying it will result in a low compacted density of the lithium iron phosphate electrode material, which cannot meet the requirements of the application scenario. There is still a gap from the theoretical compacted density of 3.6 $g/cm^3$ for lithium iron phosphate electrode material.

The prior art has the problem that the compacted density of lithium iron phosphate cannot meet the requirements.

SUMMARY

The embodiment of the present application provides a preparation method for ultra-high compacted lithium iron phosphate cathode material and lithium battery, aiming to solve the problem that the compacted density of lithium iron phosphate cannot meet the requirements to a certain extent.

In the first aspect, the present application example provides a preparation method for ultra-high compacted lithium iron phosphate cathode material, comprising:

S1. conducting a chemical reaction based on iron phosphate and dispersant to obtain an iron-containing precursor;

S2, mixing and grinding the iron-containing precursor, lithium source, phosphorus source, and first carbon source, performing the first sintering to obtain the first precursor mixture, and grind the first precursor mixture to the first preset particle size to obtain the first precursor;

S3. mixing and grinding the iron-containing precursor, the lithium source, the phosphorus source, and the second carbon source, performing a second sintering to obtain the second precursor mixture, and grinding the second precursor mixture to the second preset particle size to obtain the second precursor, where the second carbon source is amino acid chelated titanium;

S4. mixing the first precursor, the second precursor, and the third carbon source, then drying and performing a third sintering in an inert gas atmosphere to obtain the first lithium iron phosphate cathode material.

In this example, the iron-containing precursor is prepared separately to obtain a high-purity iron-containing precursor. By adjusting synthesis conditions, reactant ratios, and precipitation processes, the morphology, crystal form, and particle size of the iron-containing precursor can be controlled, thereby improving the conductivity rate of the lithium iron phosphate cathode material. Compared with the prior art, the first precursor with a larger particle size and first carbon coating is prepared based on the iron-containing precursor. Simultaneously, the second precursor with a smaller particle size and first carbon coating, doped with titanium nitride, is prepared based on the iron-containing precursor, amino acid chelated titanium, and the second carbon source. Since the amino acid chelated titanium is a complex, it can better coat the lithium iron phosphate matrix, thereby improving the coating integrity of the first carbon coating. Then, the large particle size first precursor, small particle size second precursor, and third carbon source are mixed and sintered. The size and proportion of the large particle first precursor and small particle second precursor, when meeting the grading packing, form a lithium iron phosphate cathode material with ultra-high compaction density, titanium nitride co-doping, and secondary carbon coating together with the third carbon source. The secondary carbon coating further enhances the conductivity of the lithium iron phosphate cathode material, while the co-doping of titanium and nitrogen produces a synergistic effect, improving structural stability and performing interface modification, thereby further enhancing the performance of the lithium iron phosphate cathode material. Experimental verification shows that the compacted density of the lithium iron phosphate cathode material prepared in the present application can reach 2.855 $g/cm^3$, and the compacted density of the cathode sheet of the lithium iron phosphate cathode material prepared in the present application can reach 2.9 $g/cm^3$.

The first aspect also provides a lithium manganese iron phosphate cathode material with titanium nitride co-doping and carbon coating, having ultra-high compaction density.

In the second aspect, the embodiment of the present application provides a lithium battery, which comprises a cathode sheet made from the lithium iron phosphate cathode material as described in any item of the first aspect, or the cathode sheet is made from the lithium manganese iron phosphate cathode material as described in the first aspect.

The lithium battery of the present application comprises a cathode sheet made from lithium iron phosphate cathode material with titanium nitride co-doping and carbon coating of ultra-high compaction density, or lithium manganese iron phosphate cathode material with titanium nitride co-doping and carbon coating of ultra-high compaction density. This significantly enhances the conductivity and compacted density of the cathode material, thereby providing the lithium battery with higher energy density and cycle performance.

BRIEF DESCRIPTION OF THE DRAWINGS

To more clearly illustrate the technical solutions in the examples of the present application, a brief introduction to the drawings required for the description of the examples or prior art is provided below. It is evident that the drawings described below are merely some examples of the present application. For those skilled in the art, other drawings can be obtained based on these drawings without creative effort.

DETAILED DESCRIPTION

Figure 1:
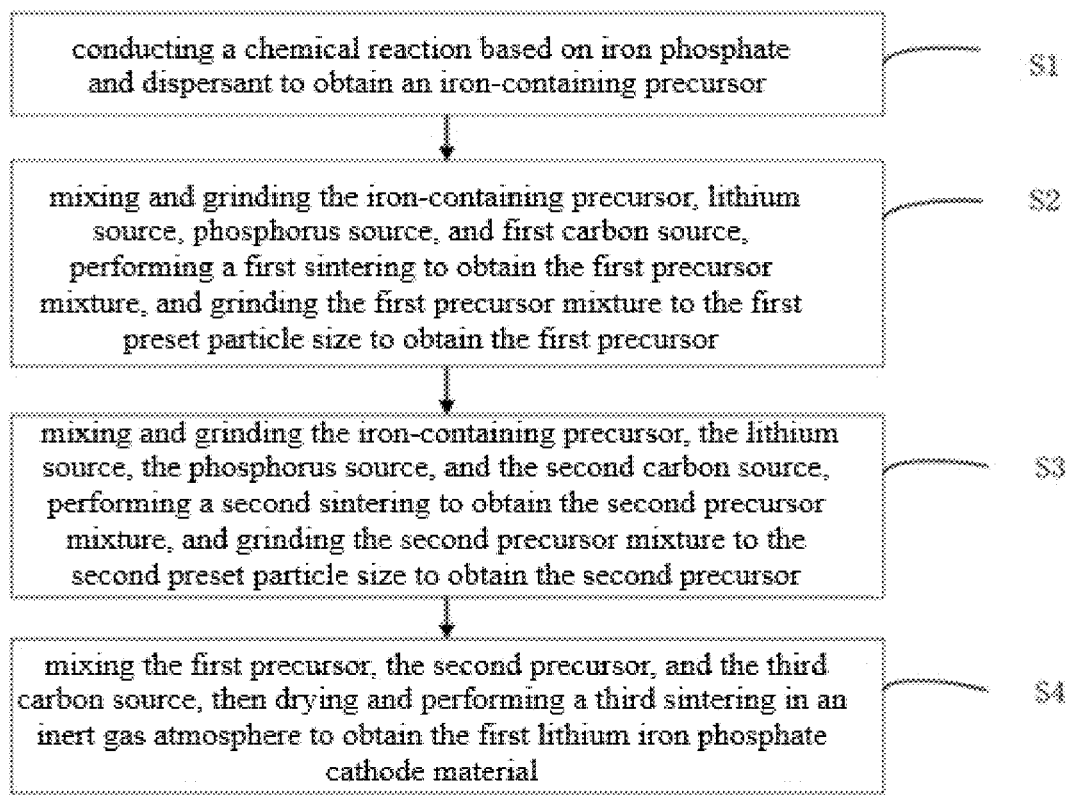
FIG. 1 is a schematic flow diagram of the preparation method for ultra-high compacted lithium iron phosphate cathode material provided in an embodiment of the present application.

To make the technical problems, technical solutions, and beneficial effects to be solved by the present application clearer, the following examples are provided for further detailed explanation of the present application. It should be understood that the specific examples described here are only used to explain the present application and are not intended to limit the present application.

In the present application, the term 'and/or' describes the relationship between associated objects, indicating that there can be three types of relationships. For example, A and/or B can mean: A exists alone, A and B exist simultaneously, or B exists alone. Here, A and B can be singular or plural. The character '/' generally indicates an 'or' relationship between the associated objects before and after it.

In the present application, 'at least one' means one or more, and 'multiple' means two or more. 'At least one of the following' or similar expressions refer to any combination of these items, comprising any combination of single or multiple items. For example, 'at least one of a, b, or c', or 'at least one of a, b, and c', can mean: a, b, c, a~b (i.e., a and b), a~c, b~c, or a~b~c, where a, b, and c can each be singular or plural.

The terms 'first' and 'second' are used solely for descriptive purposes to distinguish one entity from another and should not be understood as indicating or implying relative importance or implicitly specifying the quantity of the technical features indicated. For example, without departing from the scope of the embodiments of the present application, the first XX may also be referred to as the second XX, and similarly, the second XX may also be referred to as the first XX. Thus, features defined as 'first' and 'second' may explicitly or implicitly comprise one or more of such features.

The terminology used in the embodiments of the present application is solely for the purpose of describing particular embodiments and is not intended to limit the present application. The singular forms 'a', 'the', and 'said' as used in the embodiments of the present application and the appended claims are also intended to comprise the plural forms unless the context clearly indicates otherwise.

It should be understood that in various embodiments of the present application, the order of the above processes does not imply the sequence of execution. Some or all steps can be executed in parallel or sequentially. The execution order of each process should be determined by its function and inherent logic and should not impose any limitation on the implementation process of the embodiments of the present application.

The weight of the relevant components mentioned in the specification of the present application embodiment can not only refer to the specific content of each component but also represent the proportional relationship between the weights of each component. Therefore, as long as the content of the relevant components in the specification of the present application embodiment is proportionally enlarged or reduced, it falls within the scope disclosed in the specification of the present application embodiment. Specifically, the mass described in the specification of the present application example can be in chemical industry well-known mass units such as μg, mg, g, kg, etc.

Unless otherwise defined, all technical terms used herein have the same meaning as commonly understood by one of ordinary skill in the art. The technical terms used herein are only for the purpose of describing specific embodiments and are not intended to limit the scope of the present invention.

Unless otherwise specified, various raw materials, reagents, instruments, and equipment used in the present application can be purchased from the market or prepared by existing methods.

The currently commonly used modification preparation methods for lithium iron phosphate only modify the lithium iron phosphate electrode material, resulting in low compacted density, which cannot meet the needs of the scenario, and there is still a gap from the theoretical compacted density of 3.6 $g/cm^3$ for lithium iron phosphate electrode material.

To address the aforementioned issues to a certain extent, as shown in FIG. 1, the first aspect of the embodiment of the present application provides a preparation method for ultra-high compacted lithium iron phosphate cathode material, comprising:

S1. conducting a chemical reaction based on iron phosphate and dispersant to obtain an iron-containing precursor;

S2. mixing and grinding the iron-containing precursor, lithium source, phosphorus source, and first carbon source, performing a first sintering to obtain the first precursor mixture, and grinding the first precursor mixture to the first preset particle size to obtain the first precursor;

S3. mixing and grinding the iron-containing precursor, the lithium source, the phosphorus source, and the second carbon source, performing a second sintering to obtain the second precursor mixture, and grinding the second precursor mixture to the second preset particle size to obtain the second precursor, where the second carbon source is amino acid chelated titanium;

S4. mixing the first precursor, the second precursor, and the third carbon source, then drying and performing a third sintering in an inert gas atmosphere to obtain the first lithium iron phosphate cathode material.

In the prior art, to increase the compacted density of lithium iron phosphate cathode material, it is necessary to increase the particle size distribution width of lithium iron phosphate, or make the precursor of large particles larger or more, or make the precursor of small particles smaller or more; Increasing the size or quantity of the precursor with larger particles will lead to a deterioration in the electrochemical performance of the lithium iron phosphate material; If the particles are made smaller but the carbon layer coating is inadequate, or the doping effect is poor, they will agglomerate and grow, and side reactions with the electrode will occur, reducing the specific capacity of the lithium iron phosphate cathode material and increasing the internal resistance of the lithium battery. To overcome the aforementioned issues, in this example, an iron-containing precursor is prepared separately to obtain a high-purity iron-containing precursor. By adjusting synthesis conditions, reactant ratios, and the precipitation process, the morphology, crystal form, and particle size of the iron-containing precursor can be controlled, thereby improving the conductivity rate of the lithium iron phosphate cathode material; Then, based on the iron-containing precursor, a larger particle size first precursor with carbon coating is prepared, while a smaller particle size second precursor doped with titanium nitride and having carbon coating is prepared based on the iron-containing precursor and amino acid chelated titanium. The larger particle size first precursor and the smaller particle size second precursor are then mixed and sintered. The size and proportion of the large particle first precursor and the small particle second precursor form a lithium iron phosphate cathode material with ultra-high compaction density and dual-doped carbon coating under the densest packing. The carbon coating enhances the conductivity of the lithium iron phosphate cathode material, while the dual doping of titanium and nitrogen produces a synergistic effect, improving structural stability and performing interface modification. The synergistic effect of titanium nitride co-doping further enhances the electronic conductivity and ion diffusion rate of lithium iron phosphate, resulting in superior performance of the electrode material at high rates. Titanium nitride co-doping also alters the interfacial properties between the electrode material and the electrolyte, reducing interfacial resistance and enhancing interfacial stability. Additionally, the gradation and packing of particles of different sizes can shorten the transport path of lithium ions Li+, increase the diffusion rate of lithium ions Li+, reduce diffusion impedance, improve electrochemical kinetics, and enhance the low-temperature rate discharge performance of lithium iron phosphate batteries, thereby further improving the performance of lithium iron phosphate cathode materials.

In some examples, the amount of dispersant added in step S1 is 0.5%~2.0% of the total weight of iron phosphate and the first dispersant.

The mass percentage of the dispersant in this example can effectively disperse the iron-containing precursor without increasing costs, thereby forming an iron-containing precursor that meets the requirements for morphology, crystal form, and particle size. For example, the dispersant is polyethylene glycol, which has good water solubility (can effectively disperse particles in aqueous systems), low toxicity, biocompatibility, and surface activity (having both hydrophobic and hydrophilic parts, can reduce interfacial tension and stabilize suspensions).

Figure 2:
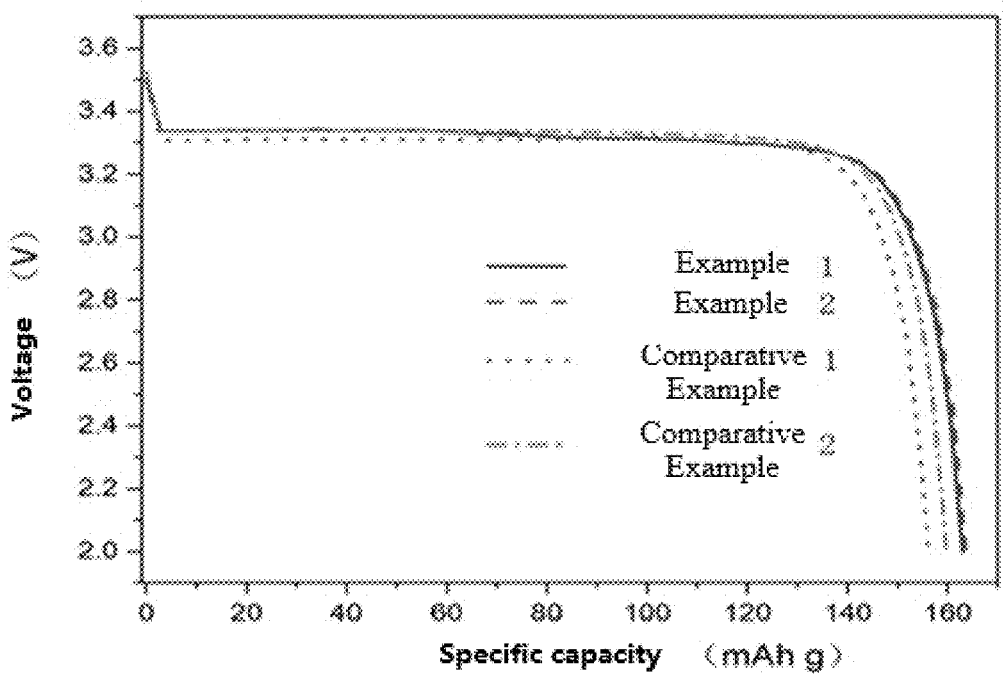
FIG. 2 is a schematic diagram of the specific capacity of the ultra-high compacted lithium iron phosphate cathode material provided in an embodiment of the present application.

In some examples, the amino acid chelated titanium is a complex formed by the chelation of amino acids with titanium ions; as shown in FIG. 2, step S3 comprises:
- S31. Mixing the iron-containing precursor, lithium source, phosphorus source, and second carbon source to obtain the first iron-containing precursor solution.
- S32. Adjusting the pH value of the iron-containing precursor solution to a preset alkaline pH value using an alkaline solution to obtain the second iron-containing precursor solution. The preset alkaline pH value is 8~10.
- S33. Grinding and drying the second iron-containing precursor solution to obtain the iron-containing precursor mixture.
- S34. Performing the second sintering on the iron-containing precursor mixture to obtain the second precursor mixture.
- S35. Grinding the second precursor mixture to the second preset particle size to obtain the second precursor; Wherein, the second precursor is a lithium iron phosphate precursor doped with titanium nitrogen and coated with a carbon layer.

In this example, by adjusting the pH value of the first iron-containing precursor mixture, the structure of the amino acid chelated titanium changes, thereby causing the chelate to decompose or separate from titanium ions to achieve titanium doping. Then, the second sintering is performed to achieve nitrogen doping and carbon coating, followed by grinding to the second preset particle size to obtain a lithium iron phosphate precursor doped with titanium nitrogen and coated with a carbon layer.

In some examples, the first preset particle size of the first precursor particles is 0.6 μm<D50 1≤1.5 μm; and/or the second preset particle size of the second precursor particles is 0.05 μm≤D50 2≤0.3 μm; and/or the ratio between the particle size D50 of the first precursor particles and the particle size D50 of the second precursor particles is (2~30):1; and/or the first preset particle size is greater than the second preset particle size.

In this example, since the particle size of the first precursor particles is larger than that of the second precursor particles, and the particle size of the second precursor particles is particularly small, the second precursor with small particle size fills the gaps of the first precursor with large particle size. Therefore, both form a graded bulk density filling, thereby achieving ultra-high compaction density.

In some examples, the parameters for the first sintering are: heating rate of 1° C./min~10° C./min, sintering temperature of 500° C.~700° C., sintering time of 3 h~8 h; and/or the parameters for the second sintering are: heating rate of 2° C./min~8° C./min, sintering temperature of 550° C.~700° C., sintering time of 3 h~8 h; and/or the parameters for the third sintering are: heating rate of 2° C./min~5° C./min, sintering temperature of 700° C.~850° C., sintering time of 3 h~10 h.

Sintering according to the first sintering parameters, second sintering, and third sintering parameters provided in this example can effectively carry out the reduction reaction, the first carbon coating of large and small particles, and the gradation stacking after mixing large and small particles, thereby improving the carbon coating integrity and compacted density of the lithium iron phosphate cathode material, and further enhancing the electrochemical performance of the lithium iron phosphate cathode material.

In some examples, the mass ratio of the first carbon source to the first precursor mixture in step S2 is (0.01~0.04): 1; And/or the mass ratio of the second carbon source to the second precursor mixture in step S3 is (0.04~0.10): 1; And/or the mass ratio between the second precursor and the total mass of both the first precursor and the second precursor is 10%~60%.

In this example, the mass ratio of the first carbon source to the first precursor mixture and the mass ratio of the second carbon source to the second precursor mixture are set. If the carbon content of the first carbon source and the second carbon source is below the mass ratio range of this example, it will cause the carbon layer coated on the surface of the lithium iron phosphate matrix to be discontinuous, resulting in poor material conductivity and poor electrochemical performance; If the carbon content of the first carbon source and the second carbon source exceeds the mass ratio range of this example, it will lead to a thicker and overly dense coated carbon layer, resulting in increased lithium ion migration resistance and reduced electrochemical performance. The carbon content of the first carbon source and the second carbon source within the mass ratio range of this example can improve the coating integrity of the carbon layer, thereby enhancing the electrochemical performance of the lithium iron phosphate cathode material. In this example, the mass ratio between the second precursor and the total mass of both the first precursor and the second precursor can satisfy the bulk density relationship, thereby forming ultra-high compacted lithium iron phosphate cathode material.

In other embodiments, after step S1, it further comprises: mixing and grinding the iron-containing precursor, lithium source, phosphorus source, and fourth carbon source, performing fourth sintering to obtain a third precursor mixture, grinding the third precursor mixture to a third preset particle size to obtain the third precursor; Mixing the first precursor, second precursor, third precursor, and third carbon source, drying them, and performing the third sintering in an inert gas atmosphere to obtain the second lithium iron phosphate cathode material.

In this embodiment, a medium particle size third precursor is formed between large and small particle sizes, thereby achieving multi-level filling of the lithium iron phosphate cathode material, further improving the compacted density of the lithium iron phosphate cathode material.

In other examples, the third preset particle size is 0.3 μm<D50 3≤0.6 μm; The mass ratio between the second precursor and the total mass of the first precursor, second precursor, and third precursor is 10%~50%; The mass ratio of the fourth carbon source to the third precursor mixture is (0.01~0.04):1.

In this example, the particle size of the third precursor is between the first precursor and the second precursor, so as to better fill the gaps between large particles, further improving the compacted density of lithium iron phosphate. In this example, the mass ratio between the second precursor with a small particle size and the total mass of the first precursor, second precursor, and third precursor satisfies the bulk density relationship, thereby forming ultra-high compacted lithium iron phosphate cathode material.

In other examples, the parameters for the fourth sintering are: heating rate of 3° C./min~6° C./min, sintering temperature of 600° C.~700° C., and sintering time of 3 h~8 h. In this example, sintering is performed according to the parameters of the fourth sintering, which can control the particle size and carbon coating of the third precursor to form a third precursor that meets the requirements.

In some examples, step S4 can also be: mixing the manganese source, first precursor, second precursor, and third carbon source, then drying, followed by the third sintering in an inert gas atmosphere to obtain the lithium manganese iron phosphate cathode material. In this example, the manganese source, large particle size first precursor, small particle size second precursor, and third carbon source are mixed and subjected to third sintering. The manganese source can be uniformly distributed in the structure of the first and second precursors, allowing manganese ions to be uniformly doped into the first and second precursors during the third sintering. Additionally, the third carbon source provides a second carbon coating to the first and second precursors, thereby enhancing the conductivity rate of the lithium manganese iron phosphate cathode material, which in turn improves its electrochemical performance.

In some examples, the lithium source comprises at least one of lithium hydroxide, lithium oxalate, lithium carbonate, lithium acetate, lithium phosphate, lithium dihydrogen phosphate, dilithium hydrogen phosphate, lithium chloride, and lithium nitrate; and/or the phosphorus source comprises at least one of ammonium phosphate, ammonium dihydrogen phosphate, diammonium hydrogen phosphate, phosphoric acid, iron phosphate, lithium phosphate, and lithium dihydrogen phosphate; and/or the manganese source is one or more combinations of manganese dihydrogen phosphate, manganese tetroxide, manganese dioxide, manganese oxide, and manganese carbonate; and/or the inert gas comprises any one of nitrogen, nitrogen-hydrogen mixed gas, argon, or hydrogen-argon mixed gas. and/or the dispersant comprises at least one of citric acid, succinic acid, triethyl phosphate, dibutyl phosphate, polyamide silicone oil, methylcyclosiloxane, sodium dodecylbenzenesulfonate, and sodium octylbenzenesulfonate; and/or the first carbon source comprises at least one of glucose, sucrose, starch, citric acid, amino acid, polyethylene glycol, and polyvinylidene fluoride, and/or the third carbon source comprises at least one of glucose, sucrose, starch, citric acid, amino acid, polyethylene glycol, and polyvinylidene fluoride, excluding the first carbon source; And/or the first carbon source, third carbon source, and fourth carbon source are at least one of glucose, sucrose, starch, citric acid, amino acid, polyethylene glycol, and polyvinylidene fluoride. This example sets the types of lithium source, carbon source, phosphorus source, manganese source, dispersant, and inert gas, providing more options, which is beneficial for selection according to the specific usage scenario requirements. At the same time, the diversification of sources also reduces production costs. Among them, the types of the first carbon source, third carbon source, and fourth carbon source can be the same or different, selected according to the specific usage scenario requirements, and this example does not impose restrictions.

In the second aspect, an embodiment of the present application provides a lithium battery, which comprises a cathode sheet made from the lithium iron phosphate cathode material as described in any item of the first aspect, or the cathode sheet is made from the lithium manganese iron phosphate cathode material as described in the first aspect.

The lithium battery of the present application comprises a cathode sheet made from ultra-high compaction density lithium iron phosphate cathode material with titanium nitride co-doping and carbon coating, or ultra-high compaction density lithium manganese iron phosphate cathode material with titanium nitride co-doping and carbon coating. This significantly enhances the conductivity and compacted density of the cathode material, thereby providing the lithium battery with higher energy density and cycle performance.

In yet another example, a preparation method for ultra-high compacted lithium iron phosphate material comprises:
S1. Conducting a chemical reaction based on iron phosphate and dispersant to obtain an iron-containing precursor;
S2. Mixing and grinding the iron-containing precursor, borane, lithium source, phosphorus source, and first carbon source, performing first sintering to obtain the first precursor mixture, and grinding the first precursor mixture to the first preset particle size to obtain the first precursor;
S3. Mixing and grinding the iron-containing precursor, lithium source, phosphorus source, and second carbon source, performing second sintering to obtain the second precursor mixture, and grinding the second precursor mixture to the second preset particle size to obtain the second precursor;
S4. Mixing the first precursor, second precursor, and third carbon source, then dry and perform the third sintering in an inert gas atmosphere to obtain the lithium iron phosphate cathode material;

In this example, compared with the prior art, a large particle size first precursor is prepared based on the iron-containing precursor, borane, lithium source, phosphorus source, and first carbon source. Since the borane generates a microporous structure to support the iron-containing precursor when the hydrogen element volatilizes, during the first sintering, the first carbon source can uniformly coat the iron-containing precursor to form boron-doped and first-time carbon-coated lithium iron phosphate, which also facilitates the multistage grading filling of voids by the small particle size second precursor; During the third sintering with the second precursor and the third carbon source, the third carbon source can also uniformly coat the first precursor or the second precursor to form ultra-high compacted second carbon-coated lithium iron phosphate cathode material. Boron doping reduces the cell parameters, thereby increasing the powder compacted density of the lithium iron phosphate cathode material. Boron doping also enhances the electrochemical activity of the lithium iron phosphate cathode material, further increasing the charge-discharge specific capacity of the lithium iron phosphate cathode material, thus improving the electrochemical performance of the lithium iron phosphate cathode material in multiple aspects.

Experimental verification shows that the compacted density of the lithium iron phosphate cathode material prepared in the present application can reach 2.850 g/cm$^3$, and the compacted density of the electrode sheet of the lithium iron phosphate cathode material prepared in the present application can reach 2.89 g/cm$^3$.

In another example, step S2 comprises: obtaining an iron-containing precursor mixture by mixing an iron-containing precursor, borane, lithium source, phosphorus source, and first carbon source; using ultraviolet light to irradiate the dried iron-containing precursor mixture; The irradiated iron-containing precursor mixture is subjected to first sintering and crushed to obtain the first precursor mixture. In this example, ultraviolet light is used to irradiate the dried iron-containing precursor mixture, causing hydrogen gas to volatilize from the borane nanosheets or borane nanomembranes, thereby forming an iron-containing precursor mixture with a microporous structure on the borane nanosheets or borane nanomembranes. During the volatilization of hydrogen gas, the second carbon source uniformly covers the lithium iron phosphate precursor, resulting in the first precursor mixture. When the first precursor, after grinding the first precursor mixture, is further sintered with the second precursor and the third carbon source in the third sintering, it also enhances the coating integrity of the second carbon source on lithium iron phosphate, thereby improving the electrochemical performance of the lithium iron phosphate cathode material.

In yet another example, the mass ratio of borane to the iron-containing precursor mixture is 1: (10,000~100,000). This example sets the mass ratio range of borane to the lithium iron phosphate precursor mixture to avoid excessive or insufficient boron doping in the carbon layer. Within the range of this example, the boron doping in the carbon layer can better enhance the conductivity of the lithium iron phosphate material. If the boron doping is below the range of this example, it will result in a low concentration of hole carriers in the carbon layer, and the improvement in carbon layer conductivity will not be significant; Excessive boron doping beyond the scope of this example will lead to too many defects in the carbon layer, disrupting the continuity of the carbon layer, which is also detrimental to the improvement of the material's electrochemical performance.

To ensure that the above implementation details and operations of the present application can be clearly understood by those skilled in the art, and to demonstrate the significant improvement in the performance of the ultra-high compacted lithium iron phosphate cathode material and lithium battery in the present application, the following examples are provided to illustrate the above technical solutions.

Example 1

Based on a 1.0 molar ratio of iron phosphate, a dispersant amounting to 1.25% of the total weight of iron phosphate and the first dispersant is used for the chemical reaction. The reaction temperature is 60° C., the reaction time is 60 min, the pH value is 5.6, and the stirring rate is 350 r/min, resulting in an iron-containing precursor.

Mixing and grinding 1.04 molar ratio of iron-containing precursor, 1.0 molar ratio of lithium source, 1.04 molar ratio of phosphorus source, and 2.5% of the first carbon source relative to the mass of the first precursor mixture and performing the first sintering to obtain the first precursor mixture. The parameters for the first sintering are a heating rate of 5° C./min, a sintering temperature of 600° C., and a sintering time of 5.5 h; Grind the first precursor mixture to a first preset particle size of 1.05 μm to obtain the first precursor.

Mixing and grinding 1.04 molar ratio of iron-containing precursor, 1.0 molar ratio of lithium source, 1.04 molar ratio of phosphorus source, and 7% of the second carbon source relative to the mass of the second precursor mixture and performing the second sintering to obtain the second precursor mixture. The parameters for the second sintering are: a heating rate of 5° C./min, a sintering temperature of 550° C.~700° C., and a sintering time of 5.5 h; Grind the second precursor mixture to a second preset particle size of 0.175 μm to obtain the second precursor, with the second carbon source being amino acid chelated titanium.

Mixing the first precursor and the second precursor, then drying them. The mass ratio between the second precursor and the total mass of the first and second precursors is 35%. Performing the third sintering in a nitrogen atmosphere with the following parameters: heating rate of 3.5° C./min, sintering temperature of 775° C., and sintering time of 6.5 h to obtain the first lithium iron phosphate cathode material.

Example 2: The Difference from Example 1 is the Addition of a Third Precursor with Medium Particle Size Based on a 1.0 molar ratio of iron phosphate, a dispersant amounting to 1.25% of the total weight relative to iron phosphate and the first dispersant is used for the chemical reaction. The reaction temperature is 60° C., the reaction time is 60 min, the pH value is 5.6, and the stirring rate is 350 r/min, resulting in an iron-containing precursor.

Mixing and grinding 1.04 molar ratio of iron-containing precursor, 1.0 molar ratio of lithium source, 1.04 molar ratio of phosphorus source, and 2.5% of the first carbon source relative to the mass of the first precursor mixture. Performing the first sintering to obtain the first precursor mixture. The first sintering parameters are a heating rate of 5° C./min, a sintering temperature of 600° C., and a sintering time of 5.5 h; Grind the first precursor mixture to a first preset particle size of 1.05 μm to obtain the first precursor.

Mixing 1.04 molar ratio of iron-containing precursor, 1.0 molar ratio of lithium source, 1.04 molar ratio of phosphorus source, and 7% of the mass of the second precursor mixture of the second carbon source, then grinding and performing the second sintering to obtain the second precursor mixture. The parameters for the second sintering are: heating rate of 5° C./min, sintering temperature of 550° C.~700° C., and sintering time of 5.5 h; Grind the second precursor mixture to a second preset particle size of 0.175 µm to obtain the second precursor, with the second carbon source being amino acid chelated titanium.

Mixing 1.04 molar ratio of iron-containing precursor, 1.0 molar ratio of lithium source, 1.04 molar ratio of phosphorus source, and 2.5% of the mass of the third precursor mixture of the third carbon source, then grinding and performing fourth sintering to obtain the third precursor mixture. The parameters for the fourth sintering are: heating rate of 4.5° C./min, sintering temperature of 650° C., and sintering time of 5.5 h. Grinding the third precursor mixture to a third preset particle size of 0.45 µm to obtain the third precursor;

The first precursor, second precursor, and third precursor are mixed and dried. The mass ratio of the second precursor to the total mass of the first precursor, second precursor, and third precursor is 50%. The third sintering is carried out in a nitrogen atmosphere with the following parameters: heating rate of 3.5° C./min, sintering temperature of 775° C., and sintering time of 6.5 h, resulting in the second lithium iron phosphate cathode material.

Comparative Example 1: The difference from Example 1 is that the second carbon source does not use amino acid chelated titanium, while other conditions remain the same, forming a comparative material of the first lithium iron phosphate cathode material.

Comparative Example 2: The difference from Example 2 is that the second carbon source does not use amino acid chelated titanium, while other conditions remain the same, forming a comparative material of the second lithium iron phosphate cathode material.

The lithium iron phosphate cathode materials obtained from Examples 1, 2, and Comparative Examples 1, 2 were assembled into coin cells to test the first discharge specific capacity at 0.1° C. rate, compacted density, and Ohmic impedance. Comparative data are shown in Table 1 and FIGS. 2 and 3, where the Ohmic impedance is taken from the real part impedance in FIG. 3. FIG. 4 is an electron microscope schematic diagram of the lithium iron phosphate cathode material with various particle size distributions.

TABLE 1

The initial discharge specific capacity at 0.1 C rate, compacted density, powder resistance, and Ohmic impedance of the lithium iron phosphate cathode materials obtained from Examples 1, 2, and Comparative Examples 1, 2, respectively:

|  | Initial charge specific capacity at 0.1 C rate/mAh/g | Compacted density g/cm$^3$ | Powder resistance/ Ω | Ohmic resistance/ Ω |
|---|---|---|---|---|
| Example 1 | 163.0 | 2.643 | 8.6 | 1.45466 |
| Example 1 | 156.2 | 2.580 | 32.5 | 2.17832 |
| Example 2 | 163.7 | 2.855 | 5.4 | 1.43628 |
| Comparative Example 2 | 159.8 | 2.721 | 21.7 | 2.12721 |

Figure 3:
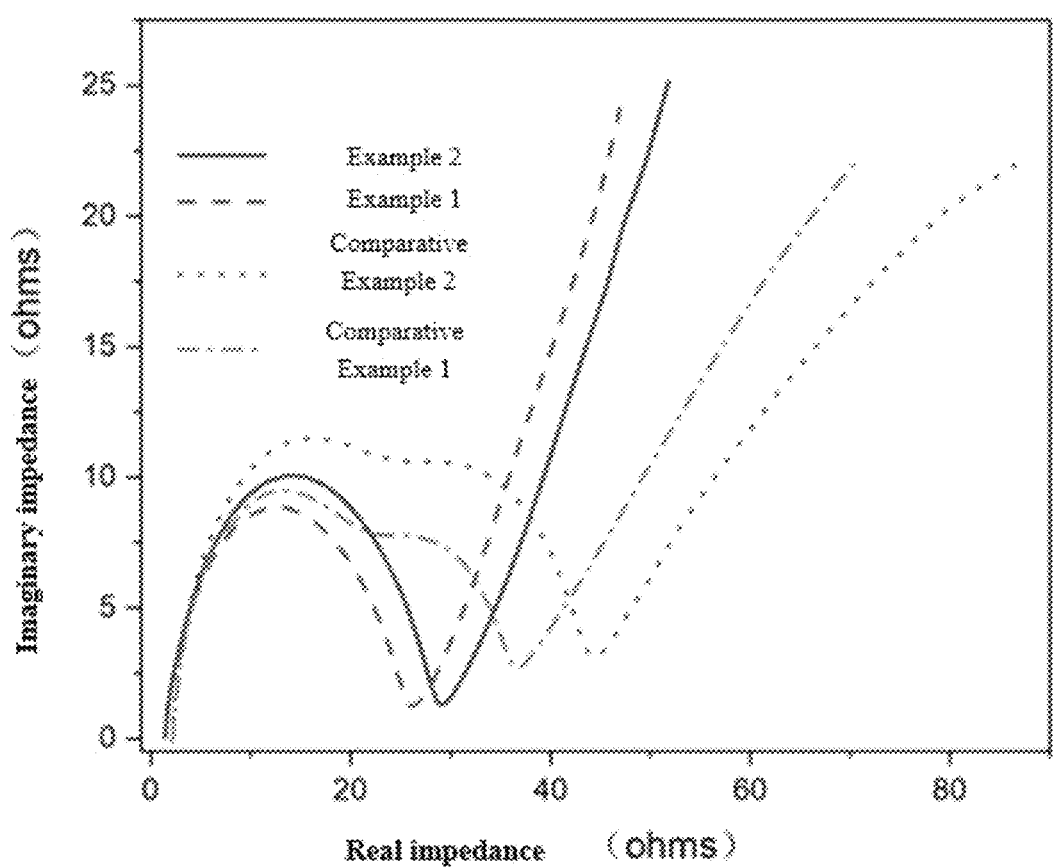
FIG. 3 is a schematic diagram of the ohmic impedance of the ultra-high compacted lithium iron phosphate cathode material provided in an embodiment of the present application.
Figure 4:
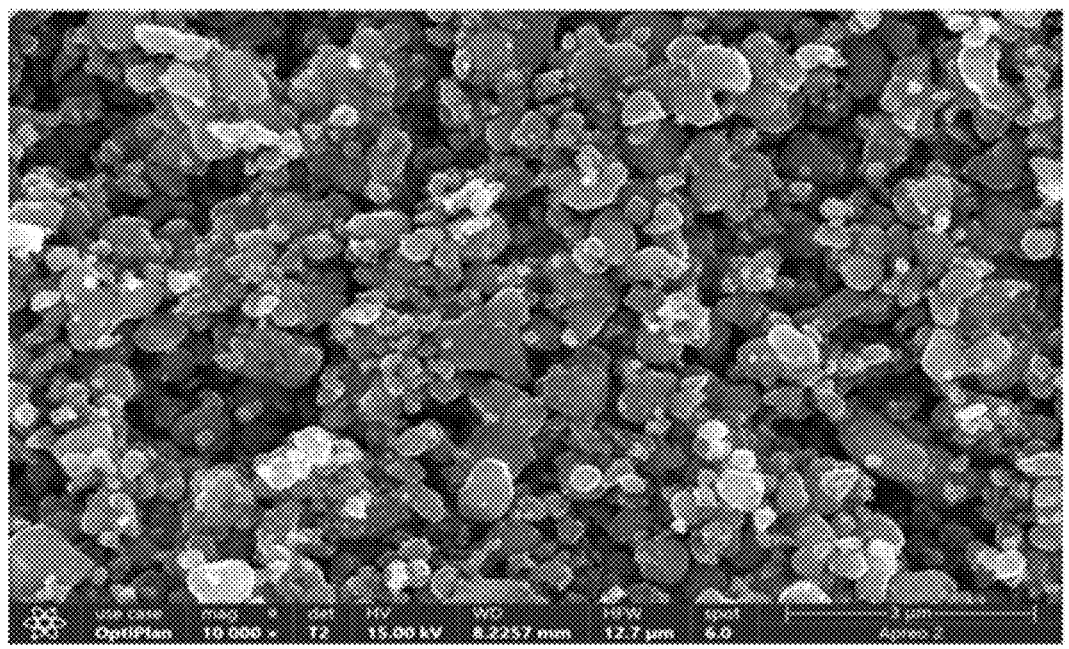
FIG. 4 is a schematic electron microscope diagram of lithium iron phosphate cathode material with various particle size distributions provided in an embodiment of the present application.

According to Table 1, FIGS. 2, and 3, it is known that when the mass of the small particle size second precursor is 50% of the total mass of the large particle size first precursor, medium particle size third precursor, and small particle size second precursor, a dual gradation filling of large, medium, and small particle size precursors is achieved. The compacted density of the lithium iron phosphate cathode material is the highest, while also maintaining the highest initial discharge specific capacity at 0.1° C. rate. The compacted density of the lithium iron phosphate using amino acid chelated titanium is higher than that of the existing technology.

It should be understood that the order of the steps in the above examples does not imply the sequence of execution. The execution order of each process should be determined by its function and internal logic and should not constitute any limitation on the implementation process of the examples in the present application.

In the above examples, the descriptions of each example have their own emphasis. Parts not detailed or recorded in a particular example can be referred to in the relevant descriptions of other examples.

The above examples are only used to illustrate the technical solutions of the present application and are not intended to limit them; Although the present application has been described in detail with reference to the foregoing examples, those skilled in the art should understand that they can still modify the technical solutions described in the foregoing examples or make equivalent replacements of some of the technical features; These modifications or replacements do not depart from the essence of the technical solutions of the embodiments of the present application and should be comprised within the scope of protection of the present application.

What is claimed is:

1. A preparation method for ultra-high compacted lithium iron phosphate cathode material, comprising: S1. conducting a chemical reaction based on iron phosphate and dispersant to obtain an iron-containing precursor; S2. obtaining an iron-containing precursor mixture by mixing the iron-containing precursor, a borane, a lithium source, a phosphorus source, and a first carbon source; using ultraviolet light to irradiate the iron-containing precursor mixture; performing a first sintering to the irradiated iron-containing precursor mixture and crushing to obtain a first precursor mixture, grinding the first precursor mixture to a first preset particle size to obtain a first precursor, wherein the borane is a borane nanosheet or a borane nanomembrane; S3. mixing and grinding the iron-containing precursor, the lithium source, the phosphorus source, and a second carbon source, performing a second sintering to obtain a second precursor mixture, and grinding the second precursor mixture to a second preset particle size to obtain a second precursor, where the second carbon source is an amino acid chelated titanium; S4. mixing the first precursor, the second precursor, and a third carbon source, then drying and performing a third sintering in an inert gas atmosphere to obtain the lithium iron phosphate cathode material.

2. The preparation method according to claim 1, wherein the first preset particle size is greater than the second preset particle size.

3. The preparation method according to claim 1, wherein the mass ratio of borane to the iron-containing precursor mixture is 1: (10,000~100,000).

4. A lithium battery, comprising a cathode sheet, wherein the cathode sheet is made of the lithium iron phosphate cathode material according to claim 1.

* * * * *